United States Patent [19]

Veith

[11] Patent Number: 5,317,660
[45] Date of Patent: May 31, 1994

[54] OPTICAL TRANSMISSION SYSTEM WITH OPTICAL FILTER FOR PROVIDING PROTECTION AGAINST GIANT PULSES

[75] Inventor: Gustav Veith, Bad Liebenzell, Fed. Rep. of Germany

[73] Assignee: Alcatel SEL A.G., Stuttgart, Fed. Rep. of Germany

[21] Appl. No.: 80,352

[22] Filed: Jun. 21, 1993

[30] Foreign Application Priority Data

Jul. 7, 1992 [DE] Fed. Rep. of Germany ....... 4222208

[51] Int. Cl.$^5$ .......................... G02B 6/26; H01L 15/00
[52] U.S. Cl. ......................................... 385/24; 385/27; 385/42; 359/179; 359/188; 359/337; 359/341
[58] Field of Search ...................... 385/24, 27, 39, 42; 359/134, 138, 160, 171, 173, 174, 179, 188, 333, 337, 341; 372/6

[56] References Cited

U.S. PATENT DOCUMENTS

| | | | |
|---|---|---|---|
| 4,881,790 | 11/1989 | Mollenauer | 385/24 |
| 4,900,119 | 2/1990 | Hill et al. | 385/27 |
| 4,947,134 | 8/1990 | Olsson | 359/341 |
| 5,140,598 | 8/1992 | Tagawa et al. | 372/6 |
| 5,140,656 | 8/1992 | Hasegawa et al. | 385/24 |
| 5,146,517 | 9/1992 | Avramopoulos et al. | 385/39 |

FOREIGN PATENT DOCUMENTS

| | | | |
|---|---|---|---|
| 0409012 | 1/1991 | European Pat. Off. | H04B 10/16 |
| 0457349 | 11/1991 | European Pat. Off. | H04B 10/16 |
| 0458256 | 11/1991 | European Pat. Off. | H04B 10/16 |

OTHER PUBLICATIONS

"Amplification of Spontaneous Emission in Erbium-Doped SIngle-Mode Fibers", E. Desurvire et al, *Journal of Lightwave Technology* vol. 7, No. 5, May 1989, pp. 835–845.

"Continuous Wave 1.6 μm Laser Action in Er Doped Garnets at Room Temperature" by H. Stange, et al Appl. Phys. B 49, 269–273 (1989).

"10 GBIT/S to 260000 Subscribers Using Optical Amplifier Distribution Network" by B. Wedding, et al., Contribution for ICC/Supercomm '92 Optical Communications 300 Level Session Impact of Optical Amplifiers on Network Architectures, published Jun. 15, 1992.

*Primary Examiner*—Frank Gonzalez
*Attorney, Agent, or Firm*—Ware, Fressola, Van Der Sluys & Adolphson

[57] ABSTRACT

In optical transmission systems with fiber-optic amplifiers, an interruption of the fiber-optic link, e.g., due to fiber breakage, may cause a giant pulse to develop. To prevent the giant pulse from propagating in the fiber-optic link, an optical filter (7) which blocks the wavelength region of the pulse is placed in the fiber-optic link. The wavelength of the optical signal must be chosen to lie outside the wavelength region of the maximum gain of the fiber-optic amplifier.

3 Claims, 1 Drawing Sheet

OPTICAL TRANSMISSION SYSTEM WITH OPTICAL FILTER FOR PROVIDING PROTECTION AGAINST GIANT PULSES

TECHNICAL FIELD

The present invention relates to an optical communication system and, more particularly, an optical transmission system for transmitting an optical signal over an optical waveguide containing at least one fiber-optic amplifier. Such system are known, e.g., from B. Wedding et al, "10 Gbit/s to 260000 Subscribers Using Optical Amplifier Distribution Network", Contribution for ICC/Supercoman '92, Optical Communications 300 level Session, "Impact of Optical Amplifiers on Network Architectures". The fiber-optic amplifier is shown in detail in EP 0 457 349 A2, for example.

In the above system, there is the danger that in the event of a break in the fiber-optic link, e.g., due to fiber breakage, high-energy pulses will be emitted. These giant pulses are caused by the fact that upon interruption of the fiber-optic link, the input power drops to zero and the light resulting from the spontaneous emission is reflected at the point of the break.

This can be described in more detail as follows. Since the pumping process is independent of the power input, energy will constantly be pumped into the amplifying medium even if the power input has dropped, so that complete population inversion will occur. When reflected light passes through the amplifying section of optical waveguide, whose active laser medium is in the inverted state, the stored energy will be suddenly reteased. Giant pulses will be emitted which are a danger to system components, such as photodetectors.

Being comparable to an effect which is well known from solid-state lasers, the giant-pulse emission is also known by the term Q-switching. For semiconductor lasers, this effect is described, for example, by Petermann, U., in "laser Diode Modulation and Noise", Kluwer Academic Publishers, UT K Scientific Publisher, Tokyo 1988.

Disclosure of Invention

It is thereof object the invention to provide an optical transmission system of the above kind wherein the danger associated with giant pulses is avoided.

To be able to attain this object, the wavelength of the optical signal must be chosen to lie outside the wavelength region of the maximum gain of the fiber-optic amplifier, where the giant-pulse emission occurs. In prior art systems, attempts are frequently made to place the wavelength of the optical signal in this wavelength region.

According to the present invention, in an optical transmission system for transmitting an optical signal over an optical waveguide containing at least one fiber-optic amplifier, the wavelength of the optical signal lies outside the wavelength region of the maximum gain of the fiber-optic amplifier, and an optical filter having a stop band in the wavelength region of the maximum gain of the fiber-optic amplifier is provided before or after at least one fiber-optic amplifier.

In further accord with the present invention, the optical filter is a wavelength-selective fused fiber coupler.

In still further accord with the present invention, the optical filter is a length of optical waveguide made of an absorbing material with a narrow absorption band.

These and other objects, features and advantages of the present invention will become more apparent in light of the following detailed description of a best mode embodiment thereof, as illustrated in the accompanying drawing.

Best Mode for Carrying Out the Invention

Figure 1:
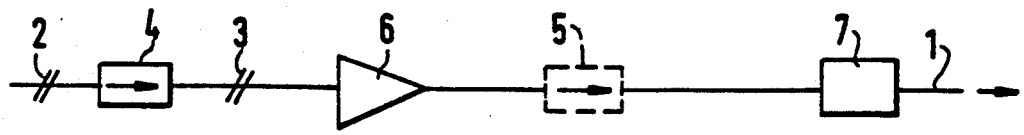
FIG. 1 shows one embodiment of a transmission link with a fiber-optic amplifier and an optical filter in accordance with the invention.

FIG. 1 shows part of an optical transmission link implemented with an optical waveguide 1, which includes a prior art fiber-optic amplifier 6.

In known system representations, an optical isolator 5 is shown at the output of the fiber-optic amplifier. It protects the fiber-optic amplifier against feedback from the subsequent portion of the fiber-optic link or from the subsequent amplifier stage. For the invention, however, this is of no significance.

An optical isolator 4 at the input of the fiber-optic amplifier can prevent the development of giant pulses if the interruption of the fiber-optic link occurs at point 2. In that case, it will prevent amplified spontaneous emission (ASE) propagating from the amplifying section of optical waveguide in a direction opposite to the direction of transmission. Thus, this emission cannot reach the point of the break in the optical waveguide and, hence, will not be reflected. If, however, the optical isolator 4 is omitted on cost grounds, or the interruption occurs at point 3, reflection of amplified spontaneous emission will occur.. This reflection, as mentioned above, will initiate the release of the energy stored in the inverted amplifying medium. The higher the rate of change of the reflected power or the faster the formation of the point of reflection, the larger the resulting pulses will be. The novel supplement to the optical transmission system is constituted by an optical filter 7, whose operation will be explained with reference to FIG. 2.

Figure 2:
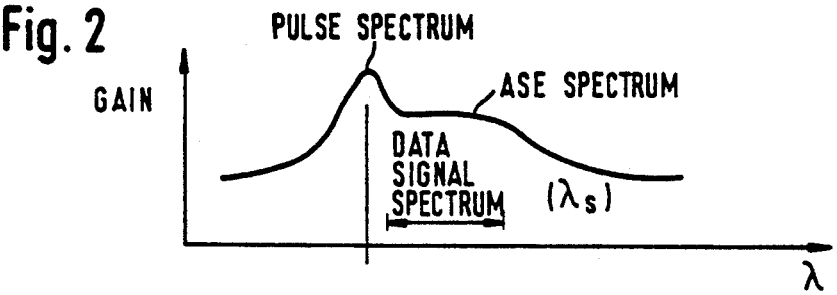
FIG. 2 shows an emission spectrum of a fiber-optic amplifier.

FIG. 2 shows the recorded (optical) spectrum of the amplified spontaneous emission (denoted in FIG. 2 by "ASE spectrum") with the superposed spectral line of the giant pulse induced by the back reflection. In the case of the erbium-doped fiber-optic amplifier, the maximum of the ASE spectrum appears at 1532 nm. It can be seen that the giant pulse occurs at the maximum of the ASE spectrum. This is due to the fact that the medium has its greatest optical gain there.

Based on recognition that the pulse spectrum has a very narrow bandwidth in the region around 1532 nm, according to the invention, light of this wavelength region is prevented from propagating in the optical waveguide by means of an optical filter 7. This optical filter has a stop band in the wavelength region of the maximum gain of the fiber-optic amplifier, i.e., in the region around 1532 nm. Since the pulse spectrum has a very narrow bandwidth, the wavelength $\lambda_e$ will henceforth be assigned to it.

The location of the optical filter depends on which devices of the transmission system have to be protected.

In practice, the fiber-optic amplifiers are also used in cascade. To prevent any escalation of the pulse, the optical filter 7 can be placed behind each fiber-optic amplifier. If the photodetector is to be protected, the optical filter 7 must be positioned in the fiber-optic link in such a way that the giant pulse will not strike the photodetector. Basically, the optical filter is designed to prevent the energy of the giant pulse from reaching the subsequent system component. The same applies analogously in the reverse direction if no optical isolator is present (e.g., to protect the optical transmitter).

Figure 3:
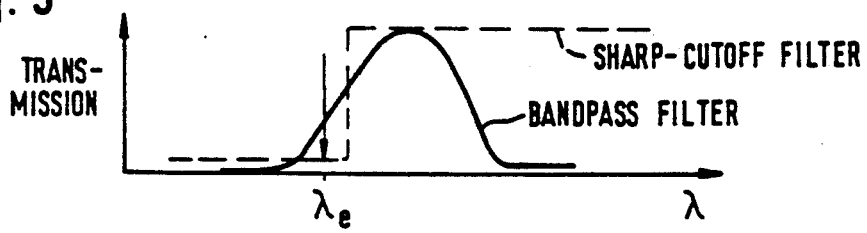
FIG. 3 shows exemplary spectral characteristics of an optical sharp-cutoff filter and an optical bandpass filter.

FIGS. 3 and 4 show embodiments of an optical filter.

FIG. 3 shows the characteristics of an optical sharp-cutoff filter and an optical bandpass filter. The passband is chosen so that the optical signal of wavelength $\lambda_s$ will be passed, white the wavelength $\lambda_e$ of the pulse will be eliminated. Examples of such optical filters are Fabry-Pérot filters, etalons, and absorbing filters.

Figure 4A:
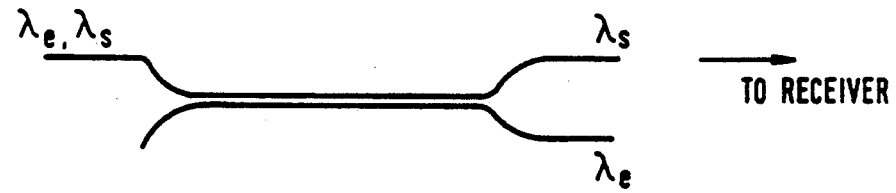
FIGS. 4A and 4B show a wavelength-selective fused fiber coupler with coupling characteristic.

The embodiment of an optical filter shown in FIG. 4A is a wavelength-selective fused fiber coupler. This coupler separates the wavelengths $\lambda_e$ and $\lambda_s$ so that only the wavelength $\lambda_s$ of the optical signal will be passed on to the receiver.

Figure 4B:
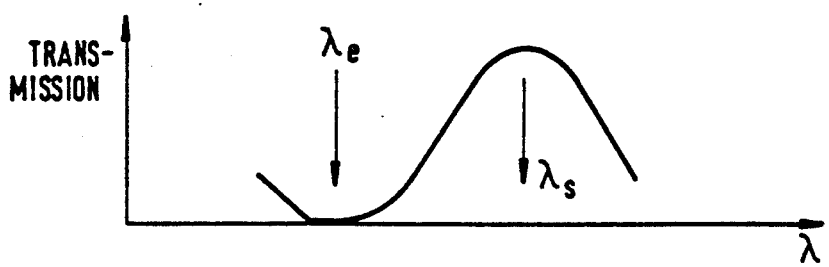

FIG. 4B is a sketch of the filter characteristic. It can be seen that the wavelength $\lambda_e$ of the pulse is eliminated.

Another possibility of eliminating the pulse wavelength is to place a length of optical waveguide made of an absorbing material with a narrow absorption band in the fiber-optic link. This may be, for example, a length of a crystalline optical waveguide doped with a rareearth element, e.g., $Er^{3+}$. A crystalline, $Er^{3+}$-doped optical waveguide has a very narrow absorption band in the region around 1530 nm. This is described in the literature, e.g., H. Stange, U. Petermann, G. Huber, E. W. Duczynski, "Continuous Wave 1.6 μm Laser Action in Er Doped Garnets at Room Temperature", Applied Physics, B 49, 269–272, 1989.

There are applications in which a specific optical filter for suppressing giant pulses is not necessary. In conclusion an example of such an application is given.

In high-bit-rate digital systems, receiver sensitivity can be improved by an optical amplifier (henceforth called "preamplifier") ahead of the receiver if a narrowband optical filter is provided between preamplifier and receiver for noise suppression.

The bandwidth of this optical filter should ideally be equal to the signal bandwidth. This optical filter can also be used to provide protection against giant pulses if the wavelength $\lambda_s$ of the optical signal does not overtap the wavelength $\lambda_e$ of the pulse. This eliminates the need for an additional optical filter.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. An optical transmission system for transmitting an optical signal over an optical waveguide containing at least one fiber-optic amplifier, wherein the wavelength of the optical signal lies outside the wavelength region of the maximum gain of the fiber-optic amplifier, and that an optical filter having a stop band in the wavelength region of the maximum gain of the fiber-optic amplifier is provided before or after at least one fiber-optic amplifier.

2. An optical transmission system as claimed in claim 1, wherein the optical filter is a wavelength-selective fused fiber coupler.

3. An optical transmission system as claimed in claim 1, wherein the optical filter is a length of optical waveguide made of an absorbing material with a narrow absorption band.

* * * * *